(12) United States Patent
Wiseman et al.

(10) Patent No.: US 8,583,564 B2
(45) Date of Patent: Nov. 12, 2013

(54) DIFFERENTIAL PRICING BASED ON SOCIAL NETWORK STANDING

(75) Inventors: Garry R. Wiseman, Issaquah, WA (US); Kurt Weber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1039 days.

(21) Appl. No.: 11/691,002

(22) Filed: Mar. 26, 2007

(65) Prior Publication Data

US 2008/0243628 A1    Oct. 2, 2008

(51) Int. Cl.
G06Q 99/00 (2006.01)
G06F 15/16 (2006.01)
G06Q 30/02 (2012.01)
G06Q 30/06 (2012.01)
G06Q 10/10 (2012.01)

(52) U.S. Cl.
CPC ........ G06Q 30/0237 (2013.01); G06Q 30/0641 (2013.01); G06Q 10/10 (2013.01)
USPC .... 705/400; 705/14.1; 705/14.27; 705/14.35; 705/27.1; 709/217

(58) Field of Classification Search
CPC ........................... G06Q 10/10; G06Q 30/0603
USPC ............... 705/1, 26, 1.1, 37, 400, 26.1, 14.1, 705/14.27, 14.35; 455/450; 709/217; 707/999.003
See application file for complete search history.

(56) References Cited

U.S. PATENT DOCUMENTS

| | | | |
|---|---|---|---|
| 6,691,232 B1 * | 2/2004 | Wood et al. ........................ | 726/6 |
| 7,058,591 B2 | 6/2006 | Giuliani et al. | |
| 7,082,409 B1 * | 7/2006 | Cherry ............................. | 705/26 |
| 7,702,545 B1 * | 4/2010 | Compton et al. ............ | 705/26.9 |
| 7,818,392 B1 * | 10/2010 | Martino et al. ................ | 709/217 |
| 7,822,631 B1 * | 10/2010 | Vander Mey et al. ......... | 705/7.29 |
| 7,877,353 B2 * | 1/2011 | Ahmed et al. ................. | 707/611 |
| 7,881,975 B2 * | 2/2011 | Calabria ....................... | 705/26.8 |
| 7,958,019 B2 * | 6/2011 | Ahmed et al. .............. | 705/26.82 |

(Continued)

FOREIGN PATENT DOCUMENTS

EP     1288795 A1 *  3/2003

OTHER PUBLICATIONS

Field, Simon, "Does Team Spirit Make Economic Sense?", Summer 2001, Organisation for Economic Cooperation and Development. The OECD Observer; 226/227; ABI/INFORM Global p. 55-56.*

(Continued)

*Primary Examiner* — John Hayes
*Assistant Examiner* — Freda A Nelson
(74) *Attorney, Agent, or Firm* — Shook, Hardy & Bacon L.L.P.

(57) ABSTRACT

A system and/or method that effectuates and facilitates the generation and provision of differential pricing policies based at least in part on the relative social network standing that a seller might have with a potential purchaser are provided. The system includes a component that receives data associated with a seller, a good, or a service that the seller lists for sale or barter in an online market place. The component determines, based at least in part on the particular good or service, a differential pricing policy that can be associated therewith. The differential pricing policy can then be utilized to selectively provide differentiated prices to a purchaser based on a relative social network standing that can be established between the purchaser and the seller.

20 Claims, 6 Drawing Sheets

(56) References Cited

U.S. PATENT DOCUMENTS

| | | | |
|---|---|---|---|
| 2002/0072975 A1 | 6/2002 | Steele et al. | |
| 2002/0087384 A1 | 7/2002 | Neifeld | |
| 2003/0033237 A1* | 2/2003 | Bawri | 705/37 |
| 2003/0154398 A1* | 8/2003 | Eaton et al. | 713/201 |
| 2003/0164399 A1 | 9/2003 | Harris | |
| 2004/0039604 A1* | 2/2004 | Tallal, Jr. | 705/2 |
| 2004/0172279 A1* | 9/2004 | Carolan et al. | 705/1 |
| 2004/0215526 A1* | 10/2004 | Luo et al. | 705/26 |
| 2005/0086101 A1 | 4/2005 | Katz et al. | |
| 2005/0125308 A1* | 6/2005 | Puentes et al. | 705/26 |
| 2005/0159970 A1 | 7/2005 | Buykkokten et al. | |
| 2006/0042483 A1 | 3/2006 | Work et al. | |
| 2006/0085259 A1* | 4/2006 | Nicholas et al. | 705/14 |
| 2006/0165005 A1 | 7/2006 | Frank et al. | |
| 2006/0167703 A1 | 7/2006 | Yakov | |
| 2006/0173963 A1* | 8/2006 | Roseway et al. | 709/206 |
| 2006/0229970 A1 | 10/2006 | Anderson et al. | |
| 2006/0271449 A1 | 11/2006 | Oliver et al. | |
| 2006/0271460 A1* | 11/2006 | Hanif | 705/35 |
| 2007/0087756 A1* | 4/2007 | Hoffberg | 455/450 |
| 2007/0106551 A1* | 5/2007 | McGucken | 705/10 |
| 2007/0162337 A1* | 7/2007 | Hawkins et al. | 705/14 |
| 2007/0168216 A1* | 7/2007 | Lemelson | 705/1 |
| 2008/0005064 A1* | 1/2008 | Sarukkai | 707/3 |
| 2008/0097934 A1* | 4/2008 | Carter, III | 705/400 |
| 2010/0229221 A1* | 9/2010 | Tam et al. | 726/4 |

OTHER PUBLICATIONS

Schafer, Ben J., Konstan, Joseph, and Riedl, John ; "Recommender Systems in E-Commerce", 1999, Science and Engineering, University of Minnesota, pp. 158-166.*

Bakos, Yannis, "The Emerging Role of Electronic Marketplaces on the Internet", Aug. 1998, Communications of the ACM, vol. 41, No. 8, pp. 35-42.*

Guiltinan, Joseph; "Dimensions of Price Differential Policies and Seller Trustworthiness: a Social Justice Perspective", 2006, Journal of Product & Brand Management; pp. 367-376.*

Simmons. "Immaterialisation—The New Reality" (2000) Addico Cornix Ltd., 8 pages.

Orda, et al. "Incentive Pricing in Multi-Class Systems" (2000) Israel Institute of Electrical Engineering, 32 pages.

Klos, et al. "Trusted Intermediating Agents in Electronic Trade Networks" (2005) ACM, pp. 1249-1250.

Fishburn, et al. "Dynamic Behavior of Differential Pricing and Quality of Service Options for the Internet" (1998) AT&T Labs-Research, 23 pages.

* cited by examiner

DIFFERENTIAL PRICING BASED ON SOCIAL NETWORK STANDING

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions, and the like are shifting paradigms and are employing the Internet to perform business rather than traditional means. For example, today consumers can access their bank accounts on-line (e.g., via the Internet) and can perform an ever growing number of banking transactions such as balance inquiries, fund transfers, bill payments, and the like.

Typically, an on-line session can include individuals interfacing with client applications (e.g., web services) to interact with a database server that stores information in a database accessible to client applications. For instance, a stock market web site can provide users with tools to retrieve stock quotes and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

Based on the ever increasing use of computers and/or the Internet, numerous transactions related to goods, services, and/or commerce have become commonplace. Yet, with the vast possibilities of the Internet, a plethora of concerns and/or suspicions can arise for a user and/or client contemplating purchase of an item, good, service, etc., over the Internet. In particular, the level of trust or lack thereof related to a seller and/or buyer involved in a transaction is a major concern in light of the various complications that can arise in completing a transaction. Moreover, these Internet consumers and/or suppliers may need additional reassurance that ensures a potential transaction is to be completed based on a preference, priority, and/or importance.

Buying and selling merchandise and services via the Internet has become more widely accepted and more secure in recent years. Aside from established merchants and commercial retailers, individuals have found a marketplace online for shopping and/or peddling their new or used merchandise as well as seeking and/or offering a variety of services. For example, many employers seeking employees and those seeking employment have turned to the Internet for opportunities. Generally speaking, this marketplace can be referred to as an online classified listing and/or an online market place and many web sites specializing in this type of commerce currently exist. Most notably, eBay and Craig's List are two of the more popular sites. Nevertheless, national sites such as eBay lack the level of personalization that may be more closely associated with some more parochial sites, such as Craig's List. For example, eBay has traditionally focused on the ability to hold auctions across the country while Craig's List has currently adopted a message board type of framework that has a more local feel, but limits users to search only a particular metropolitan area. On either site, users are left wanting more. The national site can be too large-scale and imposing for new or infrequent users and the more local based site too restrictive in terms of scope and ability to attract buyers and sellers.

Currently there are no facilities to incorporate differential pricing schemes based on social standing in social networks into pricing frameworks. Rather there only exist facilities to provide pricing schemes that allow individuals to set a single price applicable to all potential purchasers. In particular, there are no facilities that accommodate the relative affinity that a potential purchaser might have with the individual to provide differential pricing based on their relative social standing within the social network.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in one aspect provides mechanisms and methodologies to allow individuals to decide upon a percentage or fixed discount they might wish to give to buyers who are either part of their social network (e.g., friends, social acquaintances, family, or coworkers) or that have a high reputation or degree of trust within a marketplace (e.g., on-line classifieds, on-line social marketplace and the like). For example, an individual can decide to sell his/her guitar $450 to the general public, but may choose to give his/her friends and family a 10% discount off the listed price. Accordingly, when the individual's friends and family search the marketplace and see the guitar listed in the marketplace they will notice that a special discount rate/price is listed for them.

In accordance with an aspect of the claimed subject matter, a pricing component can receive data associated with a user, goods and/or services the user may wish to list for sale or barter on an online market place. The pricing component upon receipt of such information can determine, based at least in part on the goods and/or services supplied by the user, a differential pricing policy that can be associated with the goods and/or services such that potential purchasers are selectively provided differentiated prices based at least in part on their relative social network standing with respect to the user.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Unlike conventional marketplaces, the systems and methods described herein provide an online marketplace that takes advantage of an individual's social groups, networks, communities, and/or connections to facilitate the marketplace experience for the benefit of all parties in the transaction (e.g., seller and buyer, etc.). Whether buying or selling a good or service, locating employees, or and employer, the social marketplace creates more trusted filtered views of items or services posted in the online social market place. Moreover, the online social marketplace can leverage existing communications systems such as instant messaging and email systems to optimize more efficient communication between users.

Figure 1:
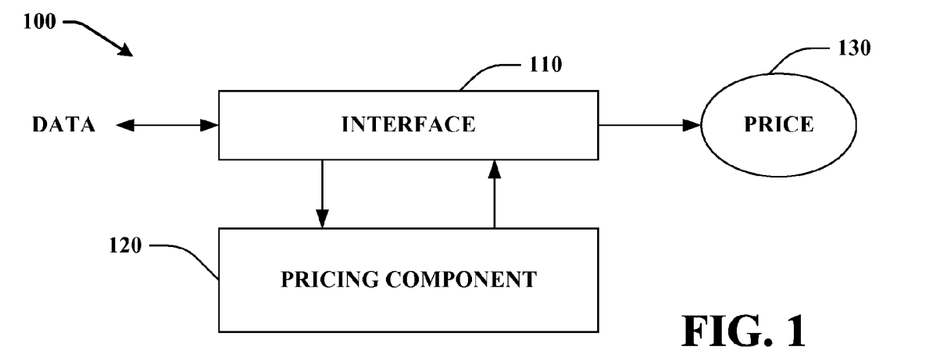
FIG. 1 illustrates a machine-implemented system that generates differential pricing in accordance with the claimed subject matter.

FIG. 1 illustrates a system 100 that in accordance with an aspect of the claimed subject matter generates differential prices based at least in part on social network standing and/or determined levels of trust that can exist between parties in an online transaction. System 100 can include interface component 110 (hereinafter referred to as "interface 110") that can receive data from a multitude of sources, such as, for example, data associated with a particular good, item for sale and/or barter, service, user, client, and/or entity involved with a portion of an online transaction, and thereafter convey the received information to pricing component 120 for further analysis. Interface 110 can subsequently receive differential pricing information 130 from pricing component 120 which can then be output in an appropriate manner.

Interface 110 can provide various adapters, connectors, channels, communication pathways, etc. to integrate the various components included in system 100 into virtually any operating system and/or database system and/or with one another. Additionally, interface 110 can provide various adapters, connectors, channels, communication modalities, etc., that provide for interaction with various components that can comprise system 100, and/or any other component (external and/or internal), data and the like associated with system 100.

Pricing component 120 in a further aspect of the claimed subject matter can establish and/or generate differential pricing based at least in part on a social network standing, affinity, and/or trust level that can exist between multiple actors in the social network, and more particularly that are parties to an online market place transaction that can be carried out within the social network. Further, pricing component 120 can establish and/or generate differential pricing based at least in part on online activity, and/or previous online transactions wherein such online transactions can comprise any suitable transaction that includes at least a portion of the transaction takes place online. For example, a transaction can originate online and can then be completed at a physical site and/or location away from the online activity (e.g., industrial warehouse, sport arena, and the like). For example, a first party can decide that he wishes to sell his extra tickets to a basketball game; accordingly the first party can offer these items for sale and/or barter on the online market place. A second party on seeing the tickets for sale can, after appropriate negotiations between the first and second parties, indicate to the first party that he wishes to purchase the proffered tickets at the set price, but actual transfer of the tickets from the first party to the second party and exchange of money from the second party to the first party might take place at the basketball arena, rather than the online marketplace. Additionally, since there can be numerous segments related to a transaction, it is to be understood that any and all such segments can be included within the purview of the single overall transaction.

Moreover, pricing component 120 can generate differential pricing based at least in part on a reputation assessment that can relate to at least one user, client, and/or entity involved in the transaction. In other words, the user, client, and/or entity can be aware of a disparate user, client, and/or entity involved in the transaction such that the reputation of the disparate user, client, and/or entity within the social network can be assessed to provide an insight that can be used to generate appropriate differential pricing.

Further, pricing component 120 can generate differential pricing based on, for example, geographical location of the parties to the transaction, or the location of the goods and/or services that are the subject of the transaction. For example, George, who lives in New York City, may wish to sell his vintage 1950's electric guitar for $250.00, but in order to avoid incurring the additional expense of insuring and shipping the guitar across the country to San Francisco, for example, may provide an appropriate discount to members of his social network that reside in the vicinity of New York City. As a further illustration, XYZ, Inc., a multinational corporation may wish to, due to economic expedience or to facilitate arbitrage, rather than shipping a load of iron ore recently acquired in Australia to the United States to dispose of iron ore on the online market place. Accordingly, XYZ, Inc., can indicate that a discount will be provided to buyers in the online market place that are located in Australia (or are willing to undertake shipment from Australia) in addition to any discount that XYZ, Inc. may typically provide buyers associated with the online market place.

In order to facilitate its aims, pricing component 120 in accordance with one illustrative aspect can receive from interface 110 data from a user, client, and/or entity regarding the good and/or service on offer. Data regarding the goods and/or services can include the type of good and/or service, the type of good and/or the kind of service, the dimensions of the good and/or conditions to be placed on the service, and other pertinent aspects associated with the good and/or service on offer. Other information that can also be supplied to pricing component 120 by interface 110 can include, but is not limited to, online activity, previous online transactions, activity of across a disparate network, activity across a network, credit card verification, membership, duration of membership, communication associated with a network, buddy lists, contacts, questions answered, questions posited, response time for questions, blog data, blog entries, endorsements, items bought, items sold, products on the network, information gleaned from a disparate website, information gleaned from a disparate network, ratings from a web site, user profiles, user information from a web site, a positive factor from another service/network, a credit score, geographical locations, a donation to charity, etc. In other words, pricing component 120 can receive any and all information/data necessary to ascertain and thereafter generate a differential pricing scheme.

In a further aspect of the claimed subject matter, pricing component 120 can also obtain information from a user, client, and/or entity regarding a suggested asking price (e.g., a price that the user, client, and/or entity may be willing to sell the item/service on offer). Occasionally, for reasons of sentimentality or due to lack of knowledge regarding the marketplace for a particular good/service, users, clients, and/or entities may unwittingly over inflate their asking price (e.g., set an asking price that is economically untenable; a price the market will not bear). Where users, clients, and/or entities set an asking price that is economically untenable and/or is unreasonable, pricing component 120 can supply or suggest a range of suggested prices that the current market might reasonably bear. For example, if the user, client, and/or entity were selling an automobile, pricing component 120 can, via interface 110, retrieve a "blue book" value for the automobile at issue. Additionally, staying in the illustrative automotive context, pricing component 120 can further obtain one or more auction price from recent automotive auctions (e.g., from online listings from established auction houses, from online auction sites, etc.), from online car dealership sites, etc., in order to provide an appropriate range of suggested asking price. Further, pricing component 120 can assay and provide suggestions regarding a reasonable asking price based on the rarity and/or age of the good and/or specialty service on offer (e.g., works of fine art, first edition books, vintage musical instruments, antique cars, vintage wines, artesian well boring services, and the like).

In a further illustrative aspect, pricing component 120 can request via interface 110 that the user, client, and/or entity supplier range of discounts that might be acceptable for various trust, affinity, social network levels. For example, a user may wish to sell his collection of English Gold Sovereigns at a particular set price, but nevertheless is amenable to accepting a reduced price from certain individuals. For instance, the user may be willing to accept a reduced price from his uncle, and an even lesser price from his twin brothers, and a further discounted price from his parents. Moreover, because the user recognizes that interest in his collection may be particularly high from potential purchasers in the United Kingdom, the user can stipulate that an augmented price in excess of a set price will be required from those purchasers located in the United Kingdom. In this regard, pricing component 120 upon receiving the user supplied discounts can, if necessary, provide or suggest a range of more reasonable, and probably more realistic, discounts based on a number of factors such as, for example, geographical locations. For instance, prices of goods can vary between different geographical markets (e.g., down filled parkas may be popular in Des Moines, Iowa, but may not necessarily be as popular in Houston, Tex.). Accordingly, pricing component 120 can indicate to a user greater or lesser discounts may be necessary to provide suitable incentives to certain users in the social network. In this manner, pricing component 120 can establish and maintain the differential pricing structure based on social network standing, and more particularly based on established trust levels, geographic locations, shared interests, familial affinities, and the like.

Figure 2:
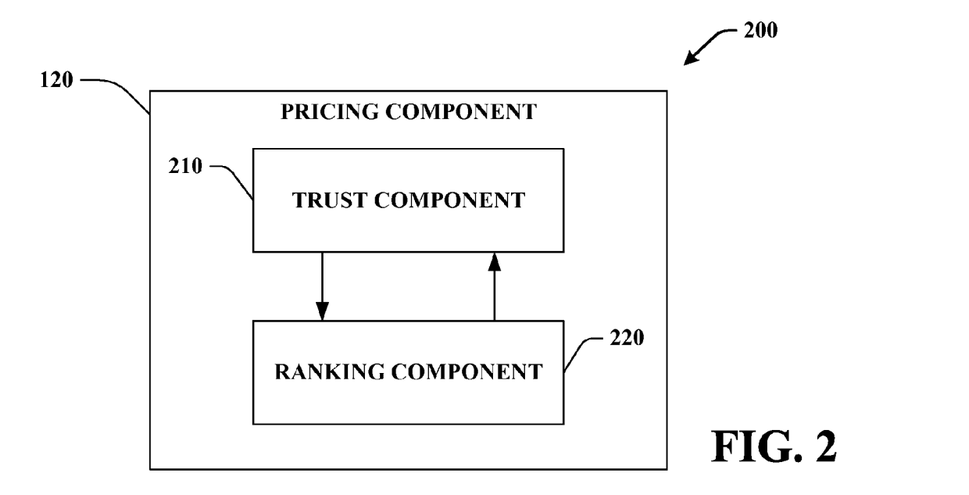
FIG. 2 provides a more detailed illustration of a pricing component in accordance with one aspect of the claimed subject matter.

FIG. 2 provides a more detailed illustration 200 of pricing component 120 that generates differential prices based at least in part on social network standing, affinity, and/or trust levels that can exist between parties in an online transaction marketplace. Pricing component 120 as illustrated can include trust component 210 that can ascertain levels of trust, personal affinity, and/or social network standing associated with a particular user, client, and/or entity. Pricing component 120 can also include ranking component 220 that can receive information from trust component 210 and dynamically assign and rank appropriate pricing points based at least in part on information supplied by trust component 210.

Trust component 210 can categorize, determine, and/or assign a trust level to one or more users based on the one or more users associations within one or more online communities, geographical area of residence, personal affinities (e.g., common interests, familial ties, etc.) between members of the community. The trust level of each user facilitates determining what content is displayed or hidden from them. Further, trust component 210 can categorize, determine, and/or assign a trust level to users based at least in part on other factors, such as, familial affinity, geographic location, standing within the online community and/or marketplace, and the like.

Many different frameworks may be possible to establish or create trust levels. One approach involves employing users circles of trust whereby each concentric circle indicates a different relationship with those included therein, and thus perhaps a different trust the shared between the user and those in that particular circle. Presumably, the outer circles are further from the user and thus the amount of trust between the user and the circles of occupants is commensurately lower. Conversely, the inner circles bear a closer relationship with the user and hence are deemed to be more trusted by the user.

A further approach that can be employed by trust component 210 can include constructing social network diagrams that can map relationships in terms of nodes and ties, wherein nodes indicate individual actors, groups of actors, and/or entities within the social network, and ties indicate relationships between the actors, groups of actors, and/or entities. There can be many kinds of ties between the nodes, but in its simplest form a social network diagram is a map of all relevant ties between the nodes under observation and as such can be utilized to establish or create trust levels.

A boosting system (not shown) can also be employed in conjunction with trust component 210 to further boost or diminish an entity's level of trust. The boosting system can either promote the user and/or the group to which the user may belong to a higher level of trust or demote the user and/or the group as a whole to a lower level of trust. Moreover, boosting system can also boost or diminish levels of trust based on geographical locations of particular users. For instance, users A and B might ordinarily exist in close proximity to one another's innermost circle of trust for most purposes despite being geographically remote from one another. However, this level of trust may be temporarily and dynamically diminished by the boosting system where A decides that the boat that she is selling will be of no interest to B given that he currently resides in a location where ownership of a boat is impractical. Similarly, where B decides that he wishes to sell the life preservers that he acquired on his last visit to A, boosting system can automatically enhance user A's trust level to indicate that A might have a more than passing interest in purchasing the life preservers for her boat.

Ranking component 220 can receive information from trust component 210 and automatically assign and rank appropriate pricing points based at least in part on information supplied by trust component 210 and other information that may have been conveyed to pricing component, such as, for example, online activity, previous online transactions, activity of across a disparate network, activity across a network, credit card verification, membership, duration of membership, communication associated with a network, buddy lists, contacts, questions answered, questions posited, response time for questions, blog data, blog entries, endorsements, items bought, items sold, products on the network, information gleaned from a disparate website, information gleaned from a disparate network, ratings from a web site, user profiles, user information from a web site, a positive factor from another service/network, a credit score, a donation to charity, etc. Ranking component 220 can thus use this information to provide a suitable ranking necessary to determine an appropriate differential pricing scheme that can be used by pricing component 120.

Figure 3:
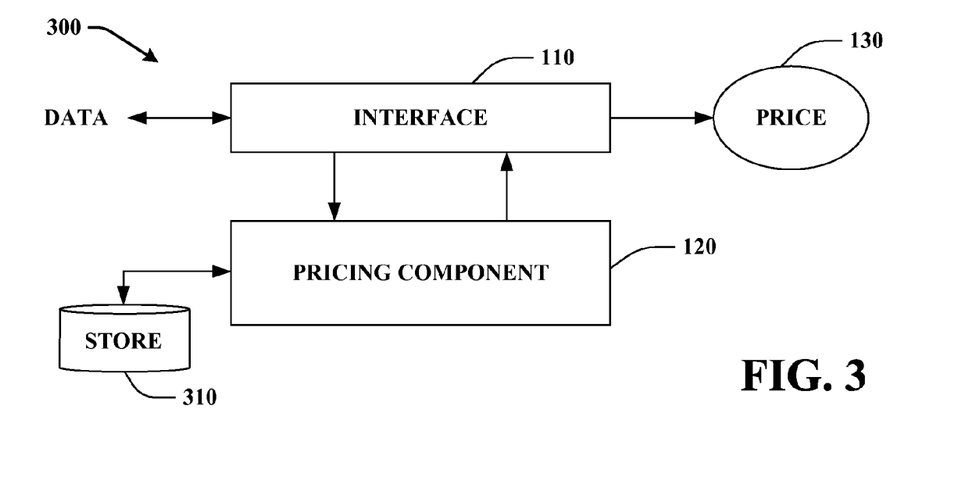
FIG. 3 illustrates a machine implement system that generates differential pricing based on a relative standing within a social network, affinity, and/or determined trust level in accordance with an aspect of the claimed subject matter.

FIG. 3 illustrates a system 300 that generates differential prices based at least in part on social network standing, affinity, and/or trust levels that can exist between parties in an online transaction marketplace in accordance with an aspect of the claimed subject matter. System 300 can gather social network standing, affinity, and or trust level information from across multiple sites (e.g., web sites, transactional sites, networks related to transactions, etc.). Specifically, system 300 can include interface 110 and pricing component 120 that in concert can generate differential price 130 as discussed supra. Additionally, system 300 can include store 310 that can include any suitable data necessary for pricing component 120 to effectuate and generate appropriate differential prices. For instance, store 310 can include information regarding a reputation assessment, is correlated to the reputation assessment respective to a particular user, karma points, user data, data related to a portion of the transaction, credit information, historic data related to a previous transaction, a portion of data associated with purchasing a good and/or service, a portion of data associated with selling a good and/or a service, a geographical location, online activity, previous online transactions, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a web site, a credit score, a geographical location, the donation to charity, or any other information related to commerce, and/or any suitable data related to transactions, etc.

It is to be appreciated that store 310 can be, for example, by the volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 310 of the subject systems and methods is intended to comprise, without being limited to, these and any other suitable types of memory. In addition, it is to be appreciated that store 310 can be a server, a database, a hard drive, and the like.

Figure 4:
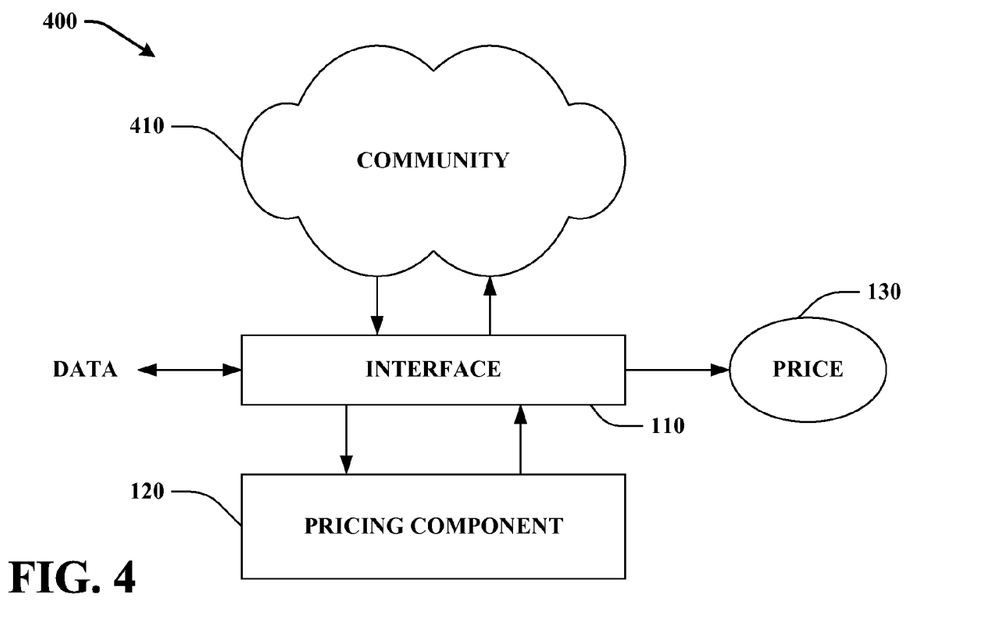
FIG. 4 depicts a system implemented on a machine that generates differential pricing in accordance with an aspect of the disclosed subject matter.

FIG. 4 provides a further illustration of a system 400 that generates differential prices based at least in part on social network standing, affinity, and/or trust levels that can exist between parties in an online transaction marketplace in accordance with a further aspect of the claimed subject matter. More particularly, FIG. 4 provides illustration of obtaining data associated with a community network 410 in order to effectuate the generation of differential prices. System 400 can thus include interface 110 and pricing component 120 that in conjunction with one another can generate one or more differential pricing scheme based on social network standing, affinity, and/or trust levels that can exist between parties in an online community network 410 as discussed above. Community network 410 can be a network associated with commerce and/or transactions related to commerce such as purchasing an item, selling an item, buying a service or portion thereof, selling a service or portion thereof, etc. Additionally and/or alternatively, community network 410 can include an instant messaging and/or email topology. Accordingly, pricing component 120 can access information located in community network 410 in order to generate appropriate differential prices and to provide necessary and timely guidance and suggestions to users, clients, and/or entities of system 400 with regard to relatively appropriate market prices and acceptable discounts that can be applied by the user, client, and/or entity to the sale or barter of their various goods and/or services.

Figure 5:
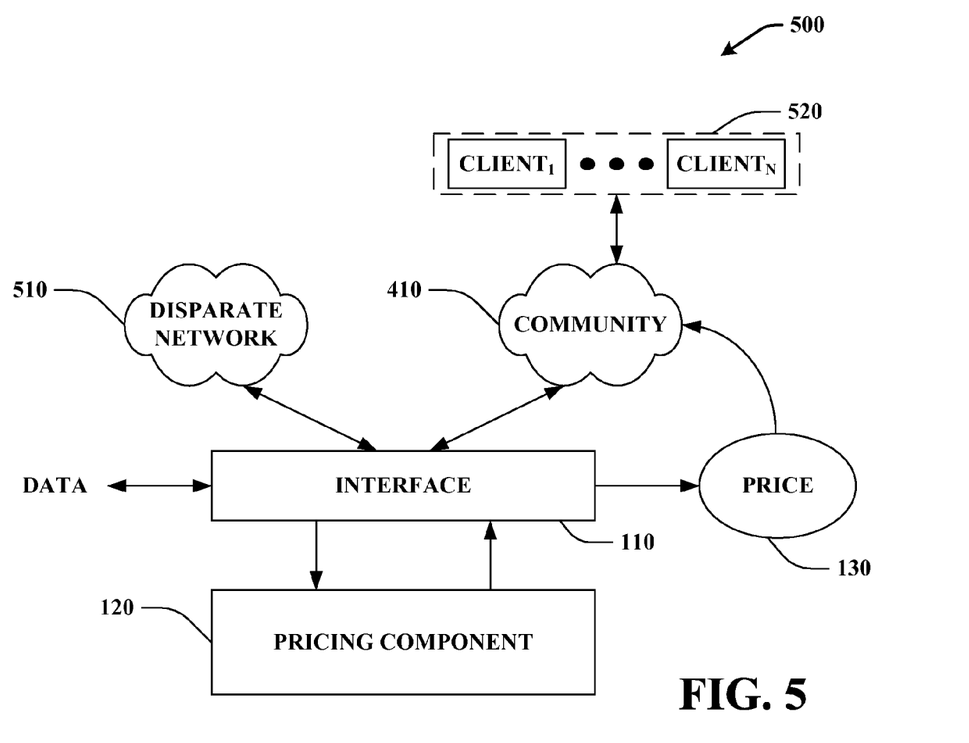
FIG. 5 illustrates a machine implement system that generates and disseminates differential pricing into an online network community in accordance with an aspect of the claimed subject matter.

FIG. 5 illustrates system 500 that facilitates disseminating a differential price into an online network community. System 500 can include interface 110 and pricing component 120 that, as has been discussed supra, can act in concert to generate and subsequently disseminate a differential pricing scheme with appropriate and desired discounts 130 necessary to provide sufficient incentives or alternatively, as the case may be, disincentives in the online market place (e.g., community network 410) to ensure that goods and/or services placed therein are purchased in an appropriate manner and that all parties are sufficiently satisfied with the entire online transaction. System 500 in addition to interface 110 and pricing component 120 that generate a differential pricing scheme with appropriate and desired discounts 130, can include network community 410 from which pricing component 120 can retrieve and/or be supplied with data necessary to generate differential pricing and discount data. Network community 410 can include a multitude of suitable clients 520, such as $client_1$ to $client_N$ where N is a positive integer. It is to be appreciated that pricing component 120 can supply differential pricing and discount data based on social network standing, related affinity information and/or trust levels associated with respective clients 520.

Figure 6:
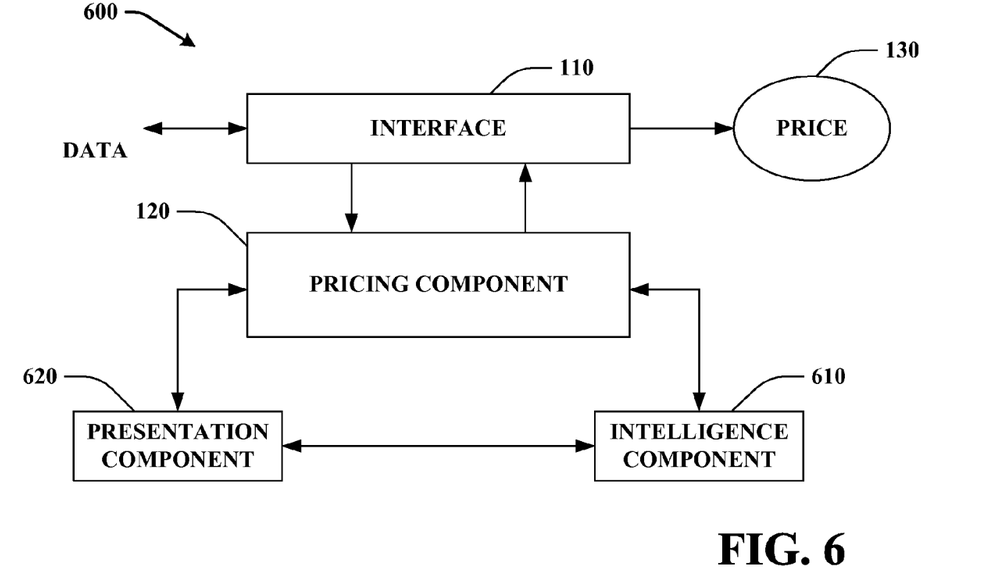
FIG. 6 depicts a system implemented on a machine that can employ intelligence to generate differential price structures in accordance with an aspect of the subject matter as claimed.

FIG. 6 illustrates a system 600 that can employ intelligence to facilitate generating differential price structures based at least in part on social network standing, related affinities and/or trust levels associated with users, clients and/or entities that can constitute an online market place. System 600 can include interface 110 and pricing component 120 that generates differential pricing information 130. System 600 further includes intelligence component 610. Intelligence component 610 can be utilized, for example, by pricing component 120 to provide suggestions to users regarding appropriate discounts that can be adopted in order to satisfy the user's requirements.

It is to be understood that intelligence component 610 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn) to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian Networks, decision trees, neural networks, fuzzy logic models, and probabilistic classification models providing different patterns of independence can be employed. Classification as used herein also is inclusive of statistical regression that is utilized to develop models of priority.

Pricing component 120 can further employ a presentation component 620 that can provide various types of user interface to facilitate interaction between a user and any component coupled to pricing component 120. As depicted, presentation component 620 is a separate entity that can be utilized with pricing component 120. However, it is to be appreciated that presentation component 620 and/or other similar view components can be incorporated into pricing component 120 and/or a standalone unit. Presentation component 620 can provide one or more graphical user interface, command line interface, and the like. For example, a graphical user interface can be rendered that provides a user with a region or means to load, import, read, etc., data, and can include a region to present the results of such. These regions can comprise known text and/or graphic regions comprising dialog boxes, static controls, drop down menus, list boxes, popup menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into pricing component 120.

The user can also interact with the regions to select and provide information via various devices such as a mouse, roller ball, keypad, keyboard, pen and/or voice activation, for example. Typically, the mechanism such as a push button or the enter key on the keyboard can be employed subsequent entering the information in order to initiate the search. However, it is to be appreciated that the claimed subject matter is not so limited. For example, nearly highlighting a check box can initiate information conveyance. In another example, a command line interface can be employed. For example, the command line interface can prompt (e.g., via a text message on a display and an audio tone) the user for information via providing a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black and white, and EGA) with limited graphic support, and/or low bandwidth communication channels.

Figure 7:
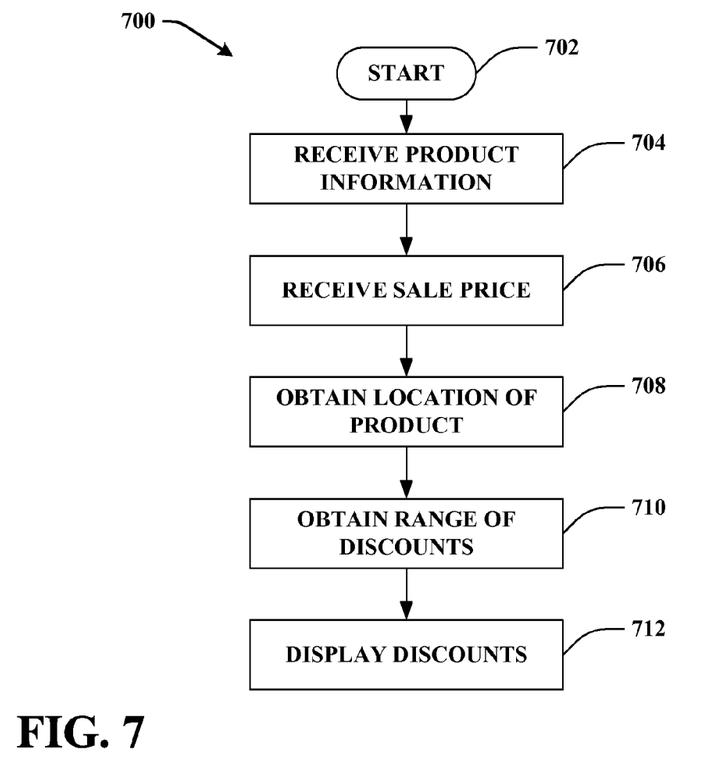
FIG. 7 illustrates a flow diagram of a machine implemented methodology that facilitates and effectuates generation of differential pricing in accordance with an aspect of the claimed subject matter.
Figure 8:
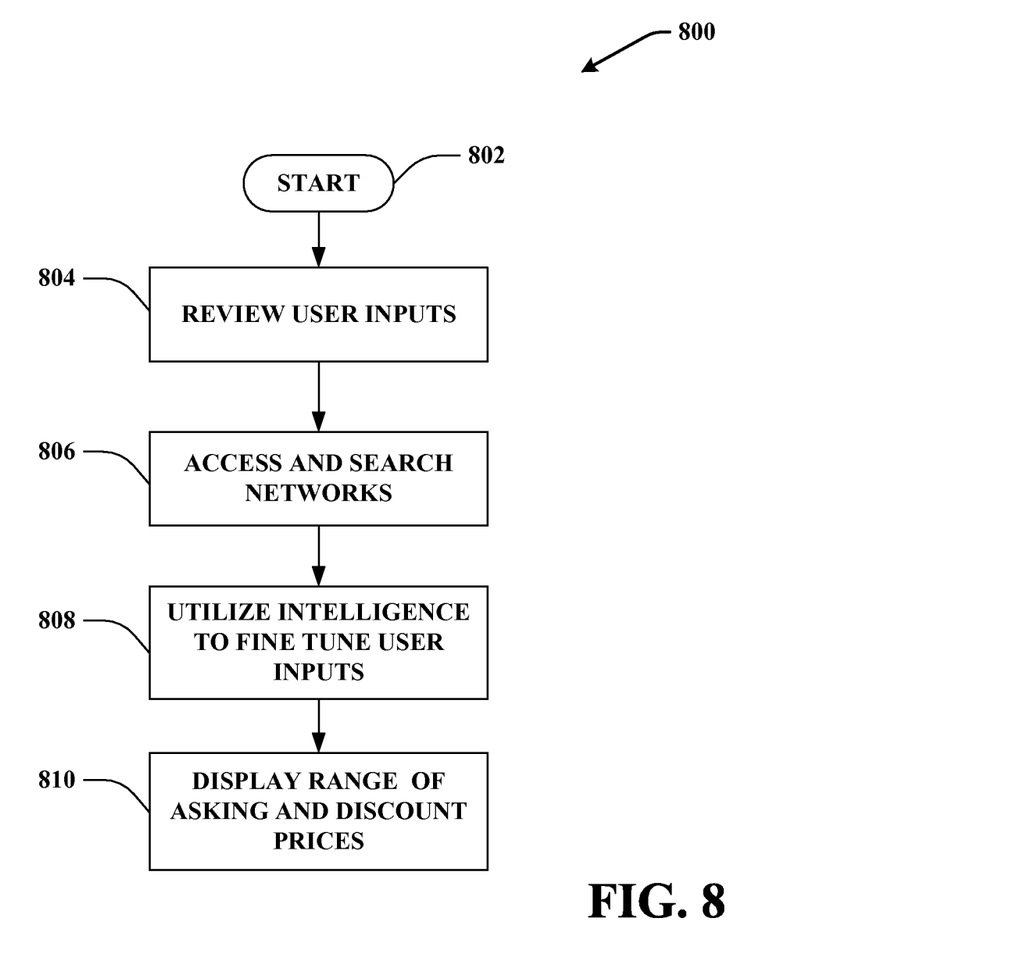
FIG. 8 illustrates a flow diagram of a method implemented on a machine that facilitates and effectuates the provision of economically viable suggestions in accordance with an aspect of the claimed subject matter.

In view of the exemplary systems shown and described supra, methodologies that may be implemented in accordance with the disclosed subject matter will be better appreciated with reference to the flow charts of FIG. 7 and FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 provides an illustrative flow diagram illustrating a method 700 that facilitates and effectuates generation of differential pricing in accordance with an aspect of the claimed subject matter. The method commences at 702 where various and sundry initializations can take place after which the method can proceed to 704 where information about the good and/or service is obtained/received by the methodology 700. Information regarding the good and/or service can include a description of the type of good (e.g., automobiles, boats, realty, merchandise, and the like) and/or services (e.g., commercial services, household services, . . . ), condition of the good and/or service, and the like. Once methodology 700 has obtained/received information about the good and/or service, the method proceeds to 706. At 706, 708 and 710 the method can respectively request that the user supply a desired sale price, indicate the geographical location of the good and/or service, and provide a range of desired discounts that he/she would be willing to consider based on various social network standing that a potential purchaser might have with the vendor (e.g., user). For example, method 700 can request that the user supply an upper and lower range of acceptable discounts. Methodology 700 can thereafter utilize the users social network, geographic location, affinities (e.g., familial, social, interests, . . . ), etc., the gleaned information regarding the good and/or service on offer, the desired sale price, and elicited range of preferred discounts, to provide (considering all the relevant input criteria, any inferred and/or deduced criteria) a range of suitable discounts applicable to the good and/or service on offer. The range of suitable discounts can accordingly be associated with various determined user/vendor-centric trust levels (e.g., determined trust levels can be ascertained from the perspective of the user/vendor) such that when a potential purchaser who is identified with a particular trust level will see the discount price associated with the particular trust level at 712.

FIG. 8 provides a flow diagram of a method 800 that facilitates and effectuates the provision of economically viable suggestions in accordance with an aspect of the claimed subject matter. Method 800 commences at 802 where general initialization tasks can be performed. At 804 the method can review user input (e.g., product and/or service type, proposed asking/selling price (if specified), potential geographic location restrictions (if any), desired range of discounts, and the like). Based on the reviewed user inputs method 800 can proceed to 806 whereupon the method can facilitate and/or effectuate access and search of various network communities to determine an appropriate market value and set of permissible discount ranges based at least in part on the previously reviewed user input. At 808 method 800 can employ one or more artificial intelligence and/or machine learning techniques to further refine the range of asking price from the product and/or service at issue as well as the range of discount that can be made available to potential purchasers or users of the good and/or service depending the purchaser's social standing and/or ascertained trust-level, affinity vis-à-vis the user/vendor of the product and/or service. At 810 the methodology displays ranges of asking and discount prices from which a user can select the most appropriate or desirable (e.g., most profitable). Ranges can be classified and/or categorized and displayed according to geographical area, familial affinity, occupational affinity, common interests, various degrees of social separation between the user and other users associated with the on-line community, etc. A user can thereafter select a range that is most applicable to him or her and it is this range of asking (selling) and discount price that can be associated with the good and/or service and selectively displayed to potential purchased based on the purchasers determined affinity with the user.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
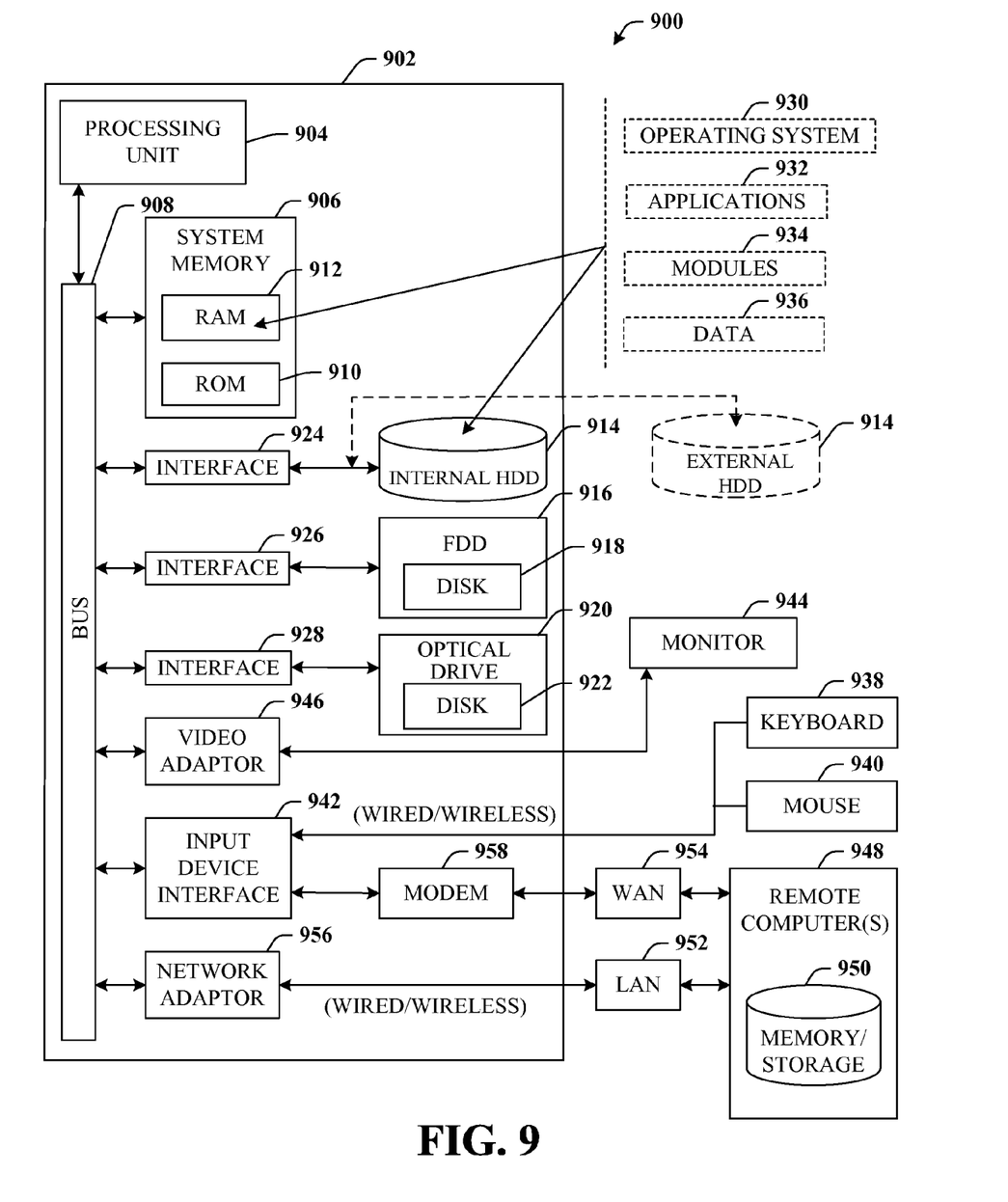
FIG. 9 illustrates a block diagram of a computer operable to execute the disclosed differential pricing architecture.

Referring now to FIG. 9, there is illustrated a block diagram of a computer operable to execute the disclosed system. In order to provide additional context for various aspects thereof, FIG. 9 and the following discussion are intended to provide a brief, general description of a suitable computing environment 900 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and nonremovable media. By way of example, and not limitation, computer-readable media can comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 10:
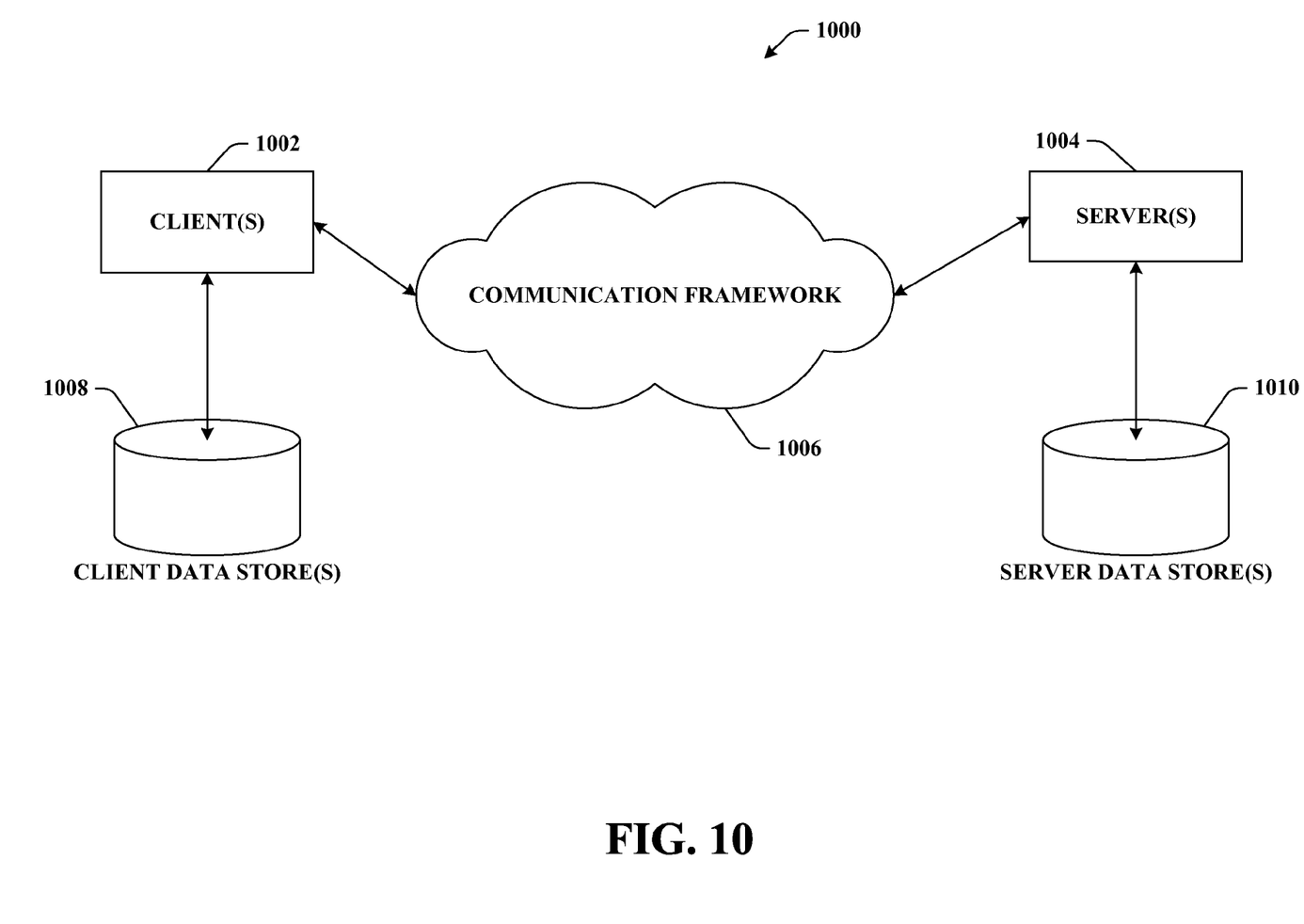
FIG. 10 illustrates a schematic block diagram of an exemplary computing environment for processing the differential pricing architecture in accordance with another aspect.

Referring now to FIG. 10, there is illustrated a schematic block diagram of an exemplary computing environment 1000 for processing the differential pricing based on social network architecture in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more hardware memory devices having embodied thereon computer-useable instructions that, when executed, implement a system that generates differential pricing based at least in part on a relative social network standing, the system comprising:
   an interface component that receives data associated with a seller, receives data associated with a good or a service that the seller places for sale or barter in an online market place, and selectively displays differentiated prices for the good or service to potential purchasers, wherein a displayed price for the good or service varies based on relative social network standings of the potential purchasers with respect to the seller, such that a first potential purchaser having a first relative social network standing with respect to the seller is presented with a first price and a second potential purchaser having a second relative social network standing with respect to the seller is presented with a second price;
   a trust component that determines the relative social network standing of the potential purchasers with respect to the seller; and
   a pricing component that determines, based at least in part on the good or service, a differential pricing policy that is associated with the good or service,
   wherein the pricing component also determines the differential pricing policy based at least in part on
   A) the good or the service,
   B) a minimum acceptable discount obtained from the data associated with the good or the service,
   C) a maximum acceptable discount obtained from the data associated with the good or the service, and
   D) the relative social network standings of the potential purchasers with respect to the seller determined by the trust component.

2. The one or more hardware memory devices of claim 1, wherein the pricing component determines the differential pricing policy based on a geographical location of the good or service.

3. The one or more hardware memory devices of claim 1, wherein the interface component receives data associated with the seller, and wherein the data associated with the seller includes online activity, previous online transactions, activity across a disparate network, activity across a network, credit card verification, credit card membership, inclusion on a buddy list, existence on a contact list, goods purchased, goods sold, or user profiles associated with the disparate network or the network.

4. The one or more hardware memory devices of claim 1, wherein the interface component receives data associated with the good, and wherein the data associated with the good includes type, asking price, description, condition, geographical location, or terms and conditions for sale of the good.

5. The one or more hardware memory devices of claim 1, wherein the interface component receives data associated with the service, and wherein the data associated with the service includes, type, requested price, description, or geographical restrictions on performance of the service.

6. The one or more hardware memory devices of claim 1, wherein the system further comprises a component that constructs a social network diagram and utilizes the social network diagram to resolve the relative social network standing of the purchaser with respect to the seller.

7. The one or more hardware memory devices of claim 6, wherein the relative social network standing between the purchaser and the seller is based at least in part on a commonality of interest, a commonality of domain name, a familial relationship, or a previous transaction.

8. The one or more hardware memory devices of claim 6, wherein the relative social network standing between the purchaser and the seller is based at least in part on a degree of separation between the seller and the purchaser where the social network diagram includes nodes and ties such that each node traversed constitutes the degree of separation between the seller and the purchaser.

9. The one or more hardware memory devices of claim 8, wherein the smaller the degree of separation between the seller and the purchaser the greater a discount offered to the purchaser.

10. The one or more hardware memory devices of claim 1, wherein the system further comprises a component that ascertains a distance from a geographical location of the seller to a geographical location of the purchaser and employs the ascertained distance to assign a tariff to the differentiated prices.

11. The one or more hardware memory devices of claim 10, wherein the greater the ascertained distance the greater the assigned tariff.

12. The one or more hardware memory devices of claim 1, wherein the system further comprises a component that constructs at least one circle of trust and utilizes the at least one circle of trust to resolve the relative social network standing of the purchaser with respect to the seller.

13. The one or more hardware memory devices of claim 12, wherein the seller is located at a center of the at least one circle of trust and the purchaser is located radially remotely from the center.

14. One or more hardware memory devices having embodied thereon computer-useable instructions that, when executed, implement a method for effectuating differential pricing based at least in part on a relative social network standing, the method comprising:
  obtaining data associated with a seller;
  obtaining from the seller data associated with a good or a service offered by the seller in an online marketplace, wherein the data includes,
    A) a desired sale price of the good or service,
    B) a minimum acceptable discount to be applied to the desired sale price, and
    C) a maximum acceptable discount to be applied to the desired sale price;
  ascertaining a differential pricing policy, based on:
    A) the good or service,
    B) the minimum acceptable discount,
    C) the maximum acceptable discount, and
    D) trust levels that exist between the seller and purchasers;
  associating the differential pricing policy with the good or service;
  when a purchaser views the good or service in the online marketplace, then determining a trust level assigned to the purchaser based on a relationship between the seller and the purchaser within a social network; and
  selectively displaying a differentiated price associated with the good or service to the purchaser, wherein the differentiated price varies within a range of prices based, at least in part, on the trust level that is assigned to the purchaser.

15. The one or more hardware memory devices of claim 14, wherein the method further comprises building a social network diagram and utilizing the diagram to resolve the relationship between the seller and the purchaser.

16. The one or more hardware memory devices of claim 14, wherein the method further comprises determining a distance from a geographical location of the seller to a geographical location of the purchaser and utilizing the determined distance to assign an additional tariff to the differentiated price.

17. The one or more hardware memory devices of claim 14, wherein obtaining the data associated with the seller includes obtaining data associated with the seller's online activity, previous online transactions, activity across a disparate network, activity across a network, credit card verification, credit card membership, inclusion on a buddy list, existence on a contact list, goods purchased, goods sold, or user profiles associated with the disparate network or the network.

18. The one or more hardware memory devices of claim 14, wherein obtaining data associated with a good or a service offered by the seller comprises obtaining data associated with a good offered by the seller, and wherein the data associated with the good offered by the seller includes type, asking price, description, condition, geographical location, or terms and conditions for sale of the good.

19. The one or more hardware memory devices of claim 14, wherein obtaining data associated with a good or a service offered by the seller comprises obtaining data associated with a service offered by the seller, and wherein the data associated with the service offered by the seller includes, type, requested price, description, or geographical restrictions on performance of the service.

20. One or more hardware memory devices having embodied thereon computer-useable instructions that, when executed, implement a method for effectuating differential pricing based at least in part on a relative social network standing, the method comprising:
  receiving information associated with a seller, with a potential purchaser, and with a good or a service offered by the seller in an online marketplace;
  generating and associating a differential pricing policy with the good or service, wherein a range of discounts is associated with a plurality of trust levels between the seller and potential purchasers; and
  determining a relative social network standing of the potential purchaser with respect to the seller; and
  determining a trust level of the potential purchaser based at least in part on the relative social network standing of the potential purchaser;
  selectively displaying a differentiated price associated with the good or service, wherein the differentiated price varies based, at least in part, on
    A) the good or service,
    B) a minimum acceptable discount obtained from the information associated with the good or the service,
    C) a maximum acceptable discount obtained from the information associated with the good or the service, and
    D) the trust level of the potential purchaser, such that when the potential purchaser views the good or service in the online marketplace, the potential purchaser is identified with a particular trust level and is presented with the differentiated price that is associated with the particular trust.

* * * * *